United States Patent
Larsson et al.

(10) Patent No.: US 12,454,180 B2
(45) Date of Patent: Oct. 28, 2025

(54) EMOTIONAL HUMAN MACHINE INTERFACE (HMI)

(71) Applicant: Ford Global Technologies, LLC, Dearborn, MI (US)

(72) Inventors: Jake Larsson, London (GB); Douglas Kilby, London (GB); Jonathan Gregory, Essex (GB); Erica Choi, London (GB); Jude Stupples, London (GB)

( * ) Notice: Subject to any disclaimer, the term of this patent is extended or adjusted under 35 U.S.C. 154(b) by 314 days.

(21) Appl. No.: 18/060,896

(22) Filed: Dec. 1, 2022

(65) Prior Publication Data

US 2024/0181876 A1    Jun. 6, 2024

(51) Int. Cl.
    *G10L 25/63*    (2013.01)
    *B60K 35/00*    (2024.01)
    (Continued)

(52) U.S. Cl.
    CPC ............. *B60K 35/00* (2013.01); *B60W 40/08* (2013.01); *G10L 25/63* (2013.01); *B60K 35/10* (2024.01); *B60K 35/29* (2024.01); *B60K 35/65* (2024.01); *B60K 35/656* (2024.01); *B60K 2360/11* (2024.01); *B60K 2360/148* (2024.01); *B60K 2360/188* (2024.01); *B60K 2360/191* (2024.01); *B60K 2360/731* (2024.01); *B60W 2540/21* (2020.02); *B60W 2540/22* (2013.01);
    (Continued)

(58) Field of Classification Search
    CPC ........ B60K 35/00; B60K 35/10; B60K 35/29; B60K 35/65; B60K 35/656; B60K 2360/11; B60K 2360/148; B60K 2360/188; B60K 2360/191; B60K 2360/731; B60K 35/28; B60W 40/08; B60W 2540/21; B60W 2540/22; B60W 2540/221; B60W 2540/223; B60W 2556/10; G10L 25/63
    See application file for complete search history.

(56) References Cited

U.S. PATENT DOCUMENTS 10,613,821 B2   4/2020  Vartakavi et al.
10,674,003 B1   6/2020  Kang et al.
(Continued)

OTHER PUBLICATIONS

Choi et al. "IOT-Based Resource Control for In-Vehicle Infotainment Services: Design and Experimentation" (Feb. 2019).
(Continued)

*Primary Examiner* — Sohana Tanju Khayer
(74) *Attorney, Agent, or Firm* — Joseph Zane; Eversheds Sutherland (US) LLP

(57) ABSTRACT

Systems and methods for implementing an emotional human-machine interface (HMI). A vehicle may comprise a display for presenting an emotional HMI. The emotional HMI may be determined by determining a first occupant of the vehicle, collecting first biometric data for the first occupant using at least the one or more sensors, determining, using an emotion engine of the vehicle, a first emotional state of the first occupant, determining a second occupant of the vehicle, determining, using the emotion engine of the vehicle, a second emotional state of the second occupant, and determining a graphical interface comprising at least a first color scheme based at least in part on the first emotional state and a second color scheme based at least in part on the second emotional state.

18 Claims, 7 Drawing Sheets

(51) Int. Cl.
  *B60K 35/29* (2024.01)
  *B60K 35/65* (2024.01)
  *B60W 40/08* (2012.01)
  *B60K 35/10* (2024.01)

(52) U.S. Cl.
  CPC . *B60W 2540/221* (2020.02); *B60W 2540/223* (2020.02); *B60W 2556/10* (2020.02)

(56) References Cited

U.S. PATENT DOCUMENTS

| | | | |
|---|---|---|---|
| 11,194,471 B1* | 12/2021 | Jacome | G06F 3/04842 |
| 2012/0164968 A1* | 6/2012 | Velusamy | H04W 4/027 |
| | | | 455/404.2 |
| 2016/0244011 A1* | 8/2016 | Ricci | G01C 21/3667 |
| 2017/0219373 A1* | 8/2017 | DiMeo | G06Q 30/0283 |
| 2017/0247000 A1 | 8/2017 | Ricci | |
| 2018/0061415 A1* | 3/2018 | Penilla | G10L 15/005 |
| 2018/0181359 A1* | 6/2018 | Monroe | G06F 3/0488 |
| 2018/0267968 A1* | 9/2018 | Shimota | G06V 20/59 |
| 2019/0008437 A1* | 1/2019 | Ben-Ezra | G06V 10/803 |
| 2019/0206399 A1* | 7/2019 | Garmark | G11B 27/11 |
| 2019/0337757 A1* | 11/2019 | Auvinen | B66B 1/468 |
| 2020/0114931 A1* | 4/2020 | Rao | B60W 40/09 |
| 2020/0152197 A1* | 5/2020 | Penilla | H04L 67/125 |
| 2020/0239002 A1* | 7/2020 | Sobhany | B60W 50/085 |
| 2021/0178897 A1* | 6/2021 | Luken | G09G 5/04 |
| 2021/0375272 A1* | 12/2021 | Madwed | G06F 3/167 |
| 2022/0063404 A1* | 3/2022 | Takabatake | B60K 35/22 |
| 2022/0144168 A1* | 5/2022 | Ito | G08B 21/24 |
| 2022/0169258 A1* | 6/2022 | Samarthyam | H04L 67/12 |
| 2023/0009304 A1* | 1/2023 | Jakobsson | G06Q 30/0241 |
| 2023/0249695 A1* | 8/2023 | Aggarwal | B60K 35/22 |
| | | | 701/1 |
| 2023/0303107 A1* | 9/2023 | Kishita | B60W 40/08 |
| 2023/0316784 A1* | 10/2023 | Damodharan | G06Q 50/26 |
| | | | 382/100 |
| 2024/0146624 A1* | 5/2024 | Amer | H04L 41/147 |
| 2024/0335748 A1* | 10/2024 | Zhang | A63F 13/533 |

OTHER PUBLICATIONS

Apple Announces Multi-Display Carplay With Integrated Speedometer, Climate Controls, and More, Apple Inc (Jun. 2022).
Paiva et al. "User Preferences in the Design of Advanced Driver Assistance Systems" (Apr. 2021).

* cited by examiner

EMOTIONAL HUMAN MACHINE INTERFACE (HMI)

BACKGROUND

Relative to recent years, many demographics are seeing fewer and fewer persons taking driving lessons and obtaining driving licenses. Recent studies have shown that the average of new driver licenses being granted is getting older and older, which suggests that younger demographics are deferring getting their driving licenses or foregoing the experience altogether.

One aspect of the driving experience that can be improved is the social or emotional aspect of driving. Driving a vehicle can be a solitary experience, and the freedom previously afforded by a vehicle to socialize with friends, getting out to explore and purchase things, etc., has been substituted by connected devices for many individuals. People can now connect with each other via smartphones and "virtually" visit the world with these devices. The experience of driving to a store to purchase a desired item can now be done entirely from the comfort of one's own home.

For some, the experience of driving and time spent within a vehicle may feel like a waste of time. Younger generations are more and more preferring to take public transport so that they can be "present" online for their journey.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
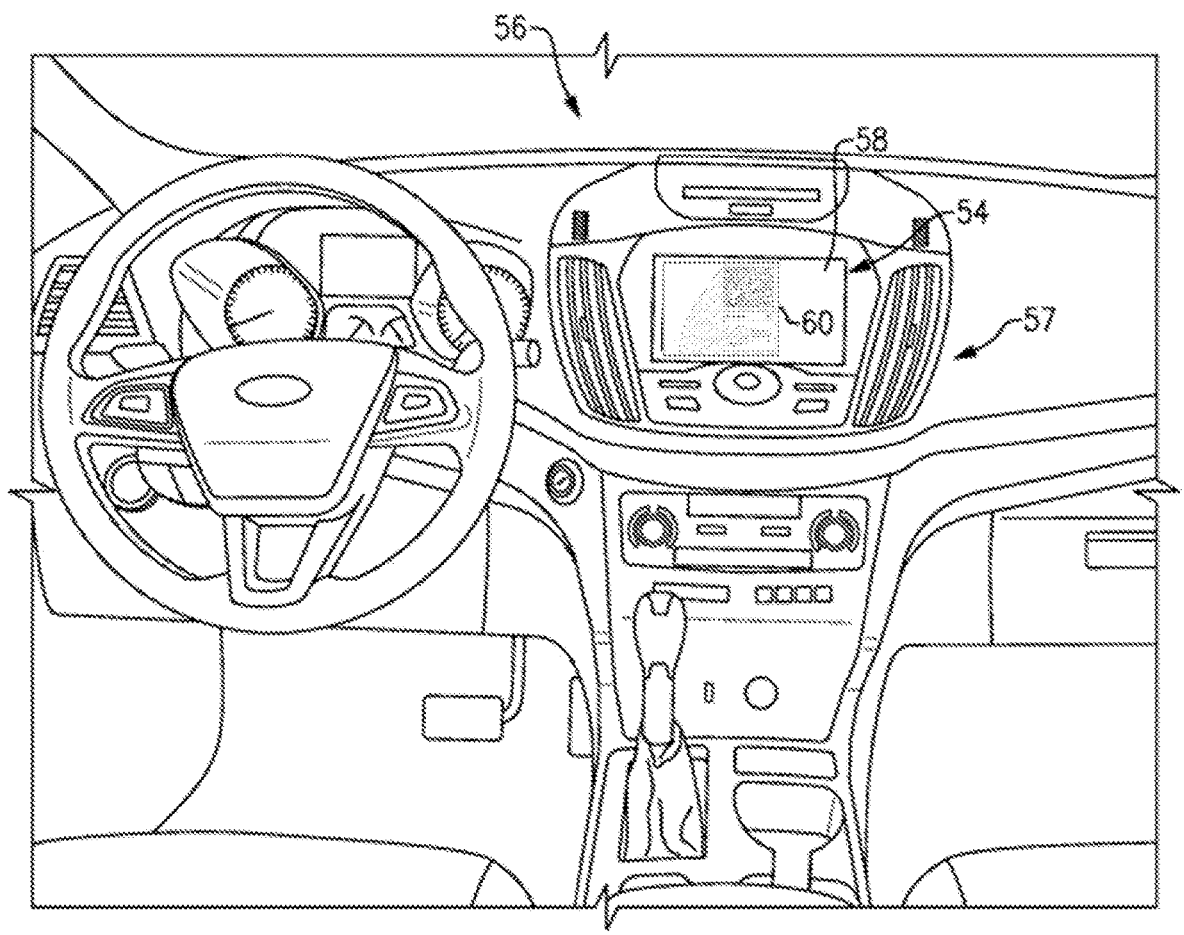
FIG. 1 illustrates an example vehicle cabin and, in particular, illustrates an in-vehicle infotainment (IVI) system, according to at least one embodiment of the present disclosure.

The present disclosure is directed to systems and methods for emotive human machine interfaces (HMIs). An emotive HMI may be implemented in the context of a vehicle, for example, using on an infotainment system with a display screen that is prominently located so as to be visible by the driver and passengers. In some cases, each occupant of a vehicle or a portion thereof has a dedicated display screen. These are merely illustrative examples of how an emotive HMI may be presented to occupants of a vehicle and should not be construed as being limited to such embodiments.

An aspect described in the present disclosure relates to a shared interface that projects two or more users' apps and preferences on a shared screen. This can include both information shared with the sharing system from the users' individual devices (e.g., mobile devices) or can be accessed via a network to a server that provides such information. For example, a user's individual playlist could be accessed directly from a user's device or indirectly via a music service provider accessible over the Internet. User can connect their devices directly to the interface.

Another aspect described in the present disclosure relates to the determination and generation of context-aware graphical interface elements. These include determining contextually relevant color schemes or "auras" based on various environmental sensors such as cameras that identify a person's clothing color or an emotion engine that collects biometric data to determine a user's mood and displays a corresponding color scheme that reflects the identified mood.

As described in greater detail below, user preferences from social media, music, and other applications can be recognized and blended together to create a co-joined social media on the interface screen. For example, a combined music playlist of two occupants of a vehicle may be created based on the likes and dislikes of both occupants, resulting in the creation of a combined playlist. The combined playlist may include, for example, songs that are liked by the occupants, songs that are not disliked by at least one occupant, songs that are identified as being similar to the tastes of the occupants, and so on and so forth.

An emotion engine as described herein may refer to hardware and software that is used to determine a user's mood or emotional state. For example, on board sensors in a vehicle may be used to collect biometric data of one or more occupants and used to determine an emotional state. The user's emotional state may be used to determine a suitable graphical interface element such as a background visualization that reflects the mood. For example, an emotion engine may collect heart rate data for one or more occupants and a camera may detect that an animal suddenly dashed across the path of the vehicle. Such sensor data may be collected and processed by an emotion engine to identify the emotional state of the user(s) as "shocked" and display a corresponding color, such as red or orange.

Yet another aspect of the present disclosure relates to showing content or statistics in common for multiple users. For example, statistics may be collected as to how many times two occupants have ridden in a vehicle together and the count may be displayed on a graphical interface. The interactions between two occupants in a vehicle may be shown, such as the number of times they have laughed together, the number of times they've chuckled at each other's jokes, and so on and so forth.

Additional aspects of the present disclosure may relate to interfaces that display aspects of real-time results of biometric data or measurements, location-based content being shown, such as highlights of places that users have visited together, complementary color schemes, detecting mode changes and offering prompts on the interface to change environmental factors, and "virtual" occupants whose content and information can be presented as above, but for the fact that the virtual occupant is not actually present in the vehicle.

In accordance with the present disclosure, use of the disclosed systems and method while the vehicle is in motion would be subject to the evolution of technology to where it is safe for a driver and occupants.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

FIG. 1 illustrates an example vehicle cabin 56 and, in particular, illustrates an in-vehicle infotainment (IVI) system 57. The in-vehicle infotainment system 57 includes the human-machine interface 54. The human-machine interface 54 includes a touchscreen 58 configured to display information to a user and allow the user to provide inputs by touching the touchscreen 58. While a touchscreen 58 is shown and described herein, this disclosure is not limited to touchscreens, and extends to other types of displays and human-machine interfaces.

Among other functions, the controller 50 is configured to present visual representations of an emotional human machine interface 54. In FIG. 1, for example, a charge distribution information interface is displayed in block 60. Examples of different graphical interfaces that may be presented on emotional human machine interface 54 are described in connection with FIGS. 2-6.

The in-vehicle infotainment system 57 may be used to communicate visual representations of emotional state to one or more occupants of the vehicle user via an emotional human-machine interface 54 or other types of interfaces, such as the vehicle's dashboard or instrument cluster (IC), or externally, for example, by communicating such information to a user's smartphone via a mobile application.

Controller 50 may be referred or may implement an emotion engine or other emotion state systems as described herein. For example, processes described in accordance with FIG. 6 may be implemented at least in part using controller 50. The controller 50 is configured to determine a graphical interface based on various information collected from sensors within the vehicle. The controller 50 may comprise an emotion engine implemented as a machine-learning model that infers the emotional state of one or more occupants of the vehicle. Changes to the vehicle environment, such as visual (e.g., lighting), audio (e.g., volume level), tactile (e.g., temperature) may be determined and/or adjusted based on the determined emotional state(s).

During most operating conditions, the controller 50 infers emotional states for one or more occupants of the vehicle and determines a graphical representation for presentation using the emotional human-machine interface 54. Such information may be presented to a human user in a visual format through the use of a display screen such as touchscreen 58. In other words, emotion-aware graphical interfaces such as those described in connection with FIGS. 2-5 may be displayed via an emotional human-machine interface 54 based on sensor data collected from within the vehicle. An example interface that may be shown in block 60 is described in connection with FIG. 2.

Figure 2:
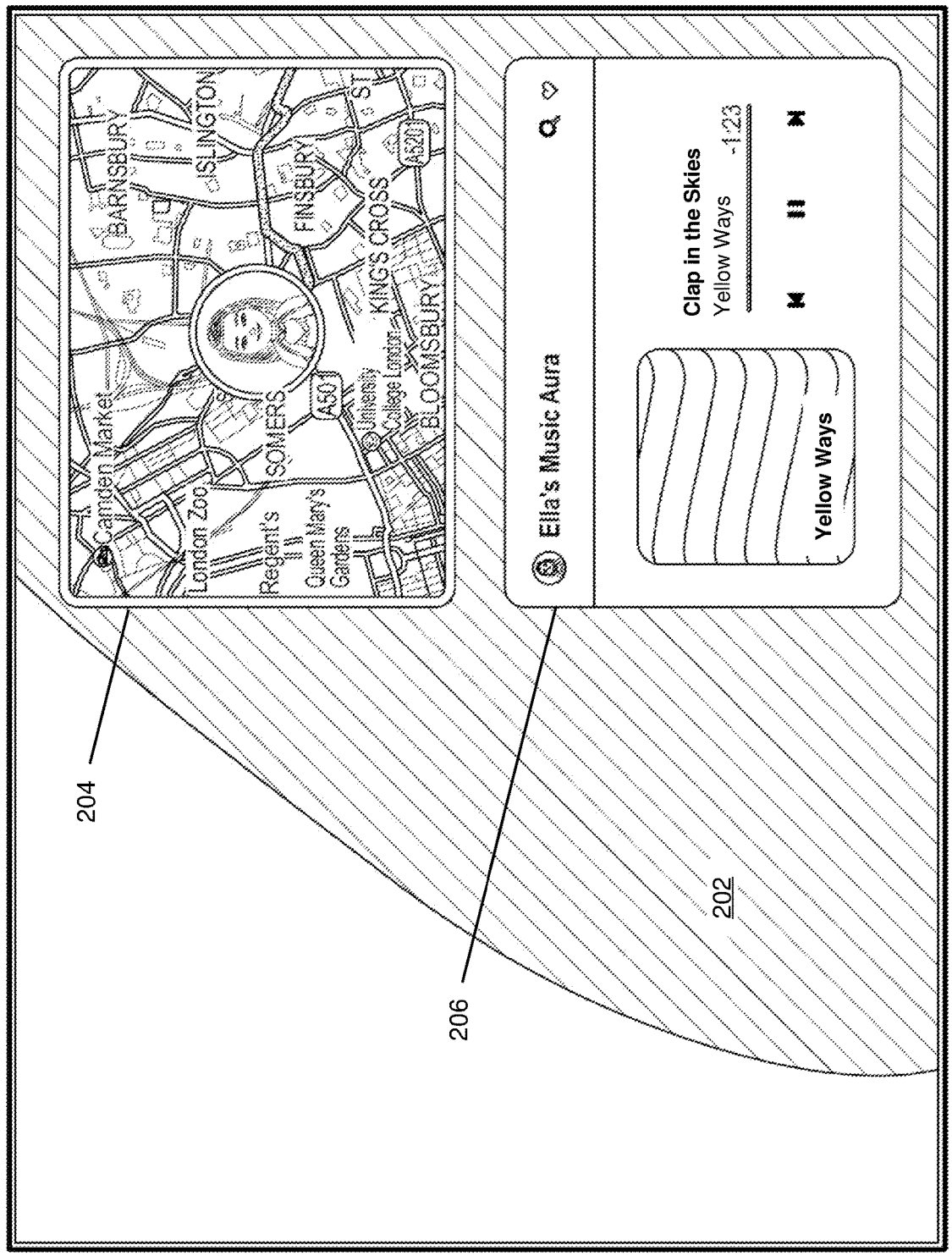
FIG. 2 illustrates an example of a single-user emotional interface, according to at least one embodiment of the present disclosure.

FIG. 2 illustrates an example of a single-user emotional interface, according to at least one embodiment of the present disclosure. The interface may be implemented by a controller, such as those described in connection with FIG. 1.

The interface shown in FIG. 2 may be presented via an emotional human-machine interface such as those described in connection with FIG. 1. For example, a touchscreen may be used to present information to a user while also allowing the user to interact with presented elements through touching, tapping, or gesturing.

An emotion engine may be used to determine one or more graphical elements of the interface. For example, the background area indicated by numeral 202 may represent a gradient or other pattern of color that is determined based on the current emotional state of the user. A user's emotional state may be determined using a machine-learning model trained to utilize biometric data to classify a user's mood. Information such as the user's speech patterns, speech volume, heart rate, temperature, eye movement, blink rate, and more may be used to classify the user's present emotional state according to a set of predefined emotional states such as being shocked, bored, happy, sad, angry, and more. In various embodiments, user generated data such as social media posts, text messages, phone calls (or transcriptions thereof) may be used to determine the user's emotional state, either in place of or in addition to biometric data. In all, a collection of data that includes biometric data and/or user generated data may be used to determine the user's current emotional state and a background "aura" may be displayed on an emotional HMI that reflects the user's current state. In various embodiments, a predefined mapping of emotional states to colors is used to select an appropriate color scheme for the aura. In various embodiments, the aura is not a static image but rather, is a visual element that is constantly changing or moving. For example, a gradient of colors according to the selected color scheme may be shown that changes at various rates. When the user has a higher heart rate, the gradient may change faster.

In various embodiments, environmental factors of the vehicle may be changed to supplement the aura. For example, if a user is excited, interior lighting elements may be updated to reflect the user's mood. For example, an orange color tone may be selected to reflect the mood, and a background aura and/or interior lighting may be made orange to reflect the user's current emotional state. In some embodiments, the heating or cooling elements of a vehicle may be controlled based on the user's current emotional state. If a user is sad, the temperature may be adjusted colder to reflect the user's mood, or may be adjusted warmer to give the user a more comfortable ride, if deemed appropriate.

The location and/or shape of the background element may be presented based on the physical location of the user. For example, if the graphical interface is being presented in an infotainment system located in the center of the vehicle (e.g., as depicted in FIG. 1) and the user is in the right-hand seat of the vehicle, then the background aura may be situated in the right-hand portion of the vehicle. Conversely, if the user is in the left-hand seat of the vehicle, then the background aura may be situated in the left-hand portion of the vehicle (not depicted in FIG. 2).

Graphical element 204 depicts a non-limiting, illustrative example of a widget that may be shown in the emotional HMI. In FIG. 2, an "avatar" of the user is shown in the map that indicates the location of the user. The map may display various nearby points of interest, street names, neighborhoods, and so forth. In particular, FIG. 2 depicts an example of a single-user environment and the map depicted in graphical element 204 likewise has only a single avatar shown in the map.

Graphical element 206 depicts a non-limiting illustration of a widget that may be shown in the emotional HMI. In FIG. 2, graphical element 206 depicts a song that is being played. The song may be played as part of a music playlist. The song and/or playlist may be streamed via a short-range wireless connection (e.g., Bluetooth) from a user's mobile device or smart phone, or may be streamed from a remote server—for example, from a music subscription service by utilizing the user's credentials.

Figure 3:
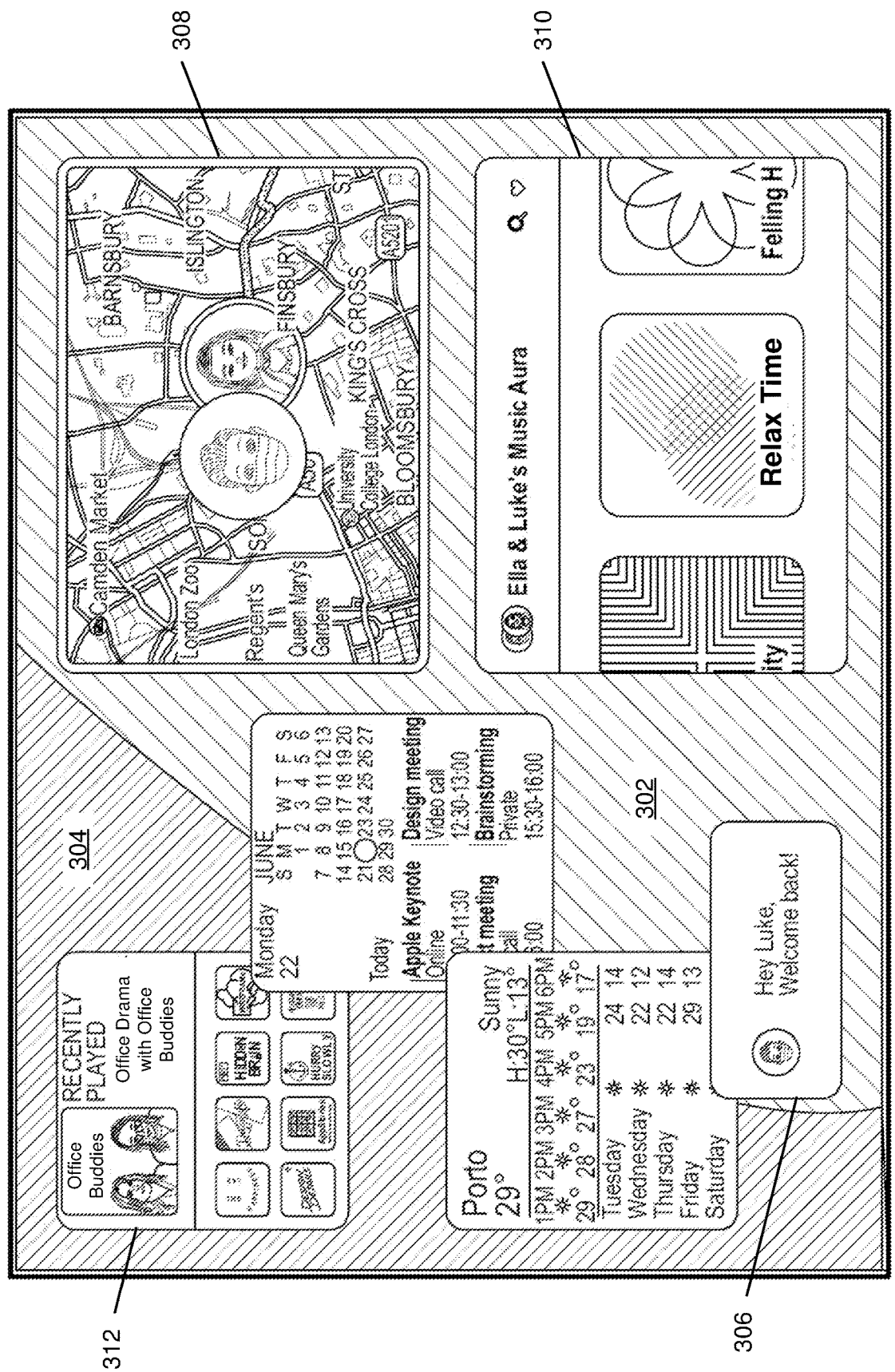
FIG. 3 illustrates an example of a multi-user emotional interface, according to at least one embodiment of the present disclosure.

FIG. 3 illustrates an example of a multi-user emotional interface, according to at least one embodiment of the present disclosure. The interface may be implemented by a controller, such as those described in connection with FIG. 1.

FIG. 3 depicts a scenario in which a multi-user emotional HMI may be presented. In this non-limiting example, a background aura for a first occupant of a vehicle "Ella" may be combined and supplemented with a background aura for a second occupant of the vehicle "Luke". Using FIG. 2 as an initial state, Ella may be an initial occupant/driver a vehicle and picks up Luke. At this point, Luke may authenticate himself with the controller system and project his aura into the emotional HMI. For example, a first background aura depicted as numeral 302 with a first color scheme and background pattern may be presented to reflect the emotional state and relative location of Ella within the vehicle and may be merged/combined with a second background aura depicted as numeral 304 with a second color scheme and background pattern that may be presented to reflect the emotional state and relative location of Luke within the vehicle. The color schemes may merge—for example, if the left-hand aura is blue in color and the right-hand aura is yellow in color, there may be a gradual change in color from blue on the left-hand portion to orange (a mixture of blue and yellow) in the middle portion and then to yellow on the right-hand portion.

Graphical element 306 may provide an indication acknowledging the newly on-boarded user. In some cases, additional information regarding the shared experiences of multiple occupants may be presented in the emotional HMI. For example, the number of rides that the two have shared together may be shown in a widget, or the number of times that they have listened to a song together, or times that they have visited a destination together, and so on and so forth.

While two background areas are depicted in FIG. 3, greater numbers of background areas may be displayed. For example, if there are 3 passengers in the vehicle, then there may be three background areas that are generally oriented based on the occupants' physical locations within the vehicle.

Graphical element 308 may refer to a map that depicts avatars or profile pictures for the multiple occupants. For example, the controller may request and receive avatar or profile information for each occupant and display them concurrently in graphical element 308. In various embodiments, the map may include interactable elements that are detected based on the combined interactions of the multiple occupants. For example, if Luke and Ella have previously visited "London Zoo" together, when that point of interest is present on the map, it may be highlighted in a different color, glowing, or otherwise indicated as being interactable. When a user interacts with this element—such as by clicking on it—additional information may be surfaced based on those interactions, such as information regarding when they visited the zoo together, photos taken at the zoo during that trip, photos taken at the zoo during that trip that include both occupants, and so on and so forth.

Graphical element 310 may represent a playlist or other content list that is generated based on profile information of multiple users. Graphical element 310 may depict a playlist that is determined based on the profile information of two or more users. For example, if Ella likes jazz, pop, and rock music but dislikes classical music, whereas Luke enjoys rap music, pop music, and dislikes rock music, a playlist of songs may be created based on those preferences. In this hypothetical example, songs from pop music genre may be played more frequently because both users enjoy the genre, whereas songs from rock and/or classical music may be played less frequently or not at all due to being disliked. Songs may be selected from existing playlists that were generated by a user or as recommendations specific to a user.

In various embodiments, the vehicle can be utilized as a platform to cast different pieces of information to a shared interface. For example, graphical element 312 may present a combined and de-duplicated list of media items that two or more occupants have purchased. For example, if a first user has purchased items {A, B, D} and a second user has purchased items {A, C, E}, then the lists of purchased content may be merged and de-duplicated so that digital content items {A, B, C, D, E} are shown as being available to be played.

Figure 4:
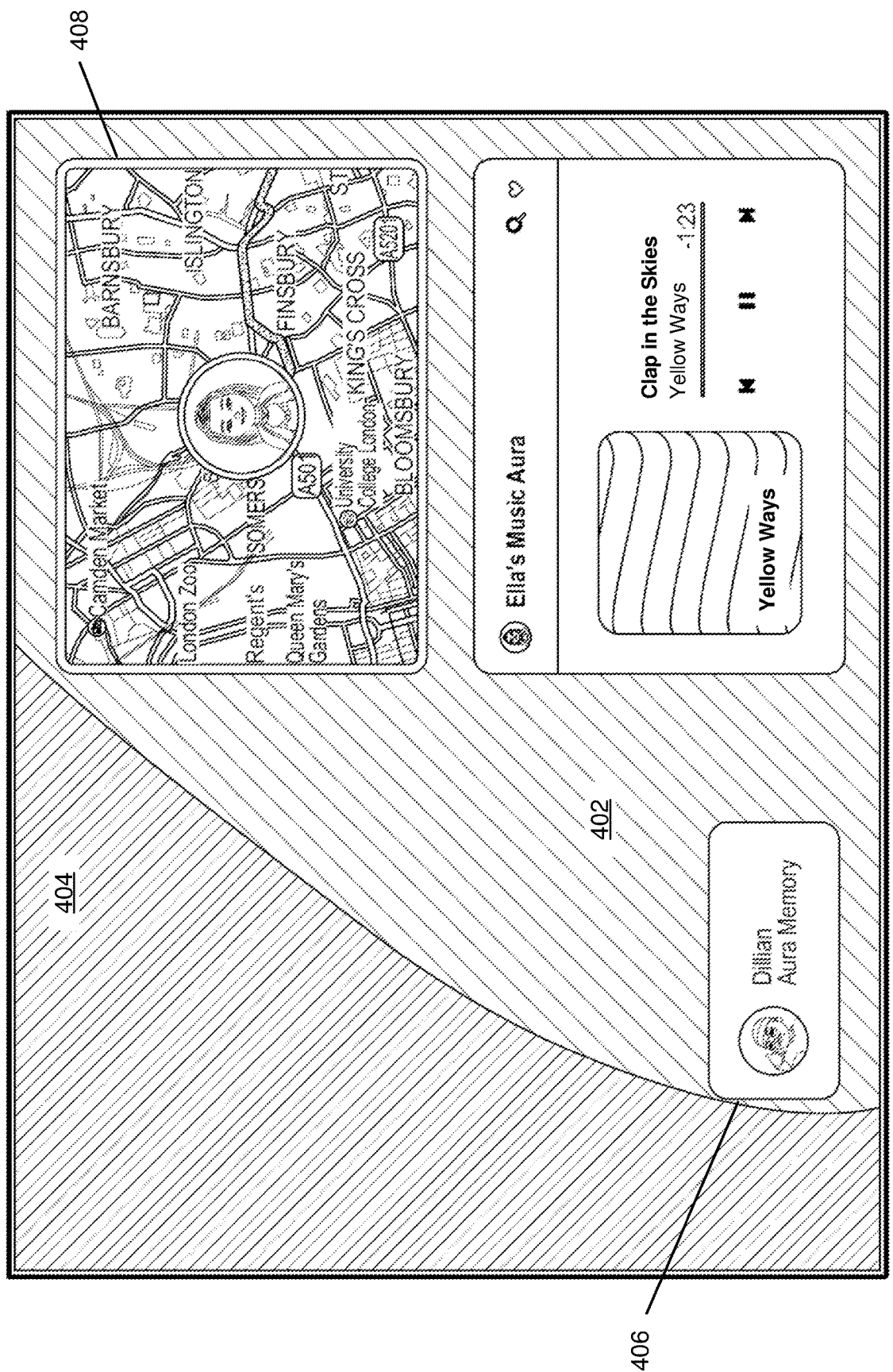
FIG. 4 illustrates an example of a virtual occupant emotional interface, according to at least one embodiment of the present disclosure, according to at least one embodiment of the present disclosure.

FIG. 4 illustrates an example of a virtual occupant emotional interface, according to at least one embodiment of the present disclosure, according to at least one embodiment of the present disclosure. The interface may be implemented by a controller, such as those described in connection with FIG. 1.

The background area indicated by numeral 402 may refer to a background aura that is generated for an occupant of a vehicle, such as a driver. This background aura as well as information displayed in widgets such as maps, playlists, and the like, may be determined for such user. This may be implemented in accordance with FIG. 2.

In various embodiments, the user may manually select or may be prompted with a suggestion for a virtual occupant. A virtual occupant may refer to an individual that is not physically in the vehicle, but whose information may be nonetheless used to present various elements within the HMI. In the context of FIG. 4, one embodiment completed herein presents a background area represented by numeral 404 that is associated with a virtual occupant. Graphical element 406 may be presented when the vehicle is driving through a location where a physical occupant has previously interacted with the virtual occupant. For example, in FIG. 4, Ella may drive near or through a neighborhood where she and Dillian previously attended a concert or ate a meal together. Responsive to a historical interaction, the background may change from what was previously displayed (e.g., as shown in FIG. 2) to what is shown in FIG. 4. The background area 404 may be presented as if Dillian were physically present in the left-hand seat of the vehicle. In various embodiments, graphical element 406 presents the user with a prompt asking whether the user would like to have Dillian "sit in" as a virtual occupant. Upon confirmation, the background may change. However, if the user dismisses the prompt, then the graphical interface may revert to a single-user state, such as depicted in FIG. 2.

The background area for a virtual occupant may be determined using various techniques. For a physical occupant, sensors within the vehicle may be used to capture the physical occupant's emotional state. However, for a virtual occupant, such information is not be directly available. Accordingly, the background area for the virtual occupant may be determined based on other data, such as the user's profile picture and determining a color that corresponds to the profile picture. For example, if the virtual occupant is wearing a yellow hat in his or her profile picture, the background aura may be yellow. In various embodiments, the vehicle may connect to other devices to determine the virtual occupant's emotional state. For example, if the virtual occupant wears a fitness tracker, biometric data from the fitness tracker or other wearable device comprising sensors for collecting biometric data may be used to determine the virtual occupant's heart rate or other biometric data in real-time.

Graphical element 408 may display map information similar to FIG. 2. In various embodiments, a virtual occupant differs from a physical occupant in that the virtual occupant is not shown in the map whereas physical occupants are visible. The map shown in FIG. 2 may be contrasted with the map shown in FIG. 3 where two physical occupants are shown.

Figure 5:
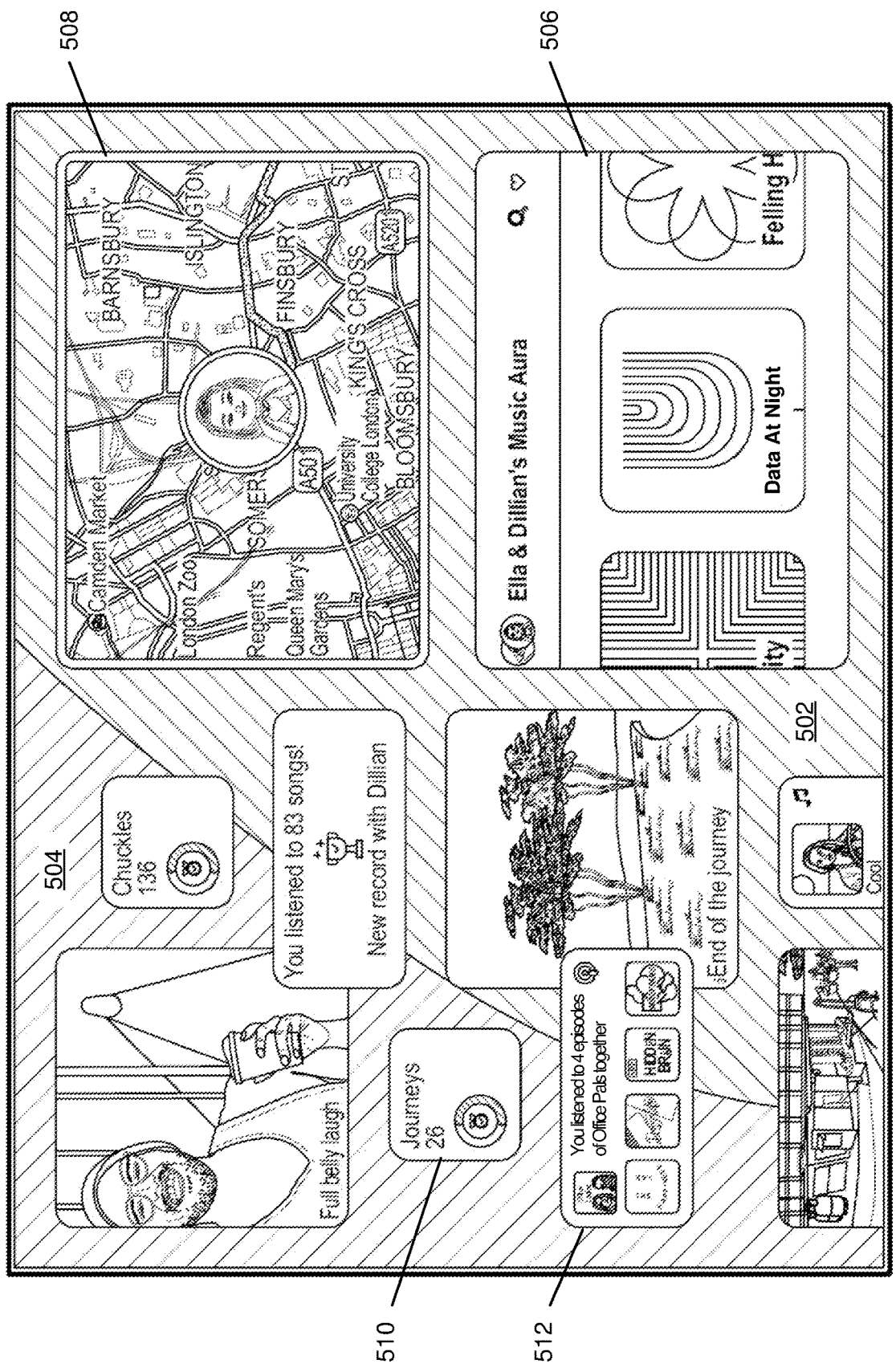
FIG. 5 illustrates an example of a virtual occupant emotional interface, according to at least one embodiment of the present disclosure, according to at least one embodiment of the present disclosure.

FIG. 5 illustrates an example of a virtual occupant emotional interface, according to at least one embodiment of the present disclosure, according to at least one embodiment of the present disclosure. The interface may be implemented by a controller, such as those described in connection with FIG. 1. The graphical elements shown in FIG. 5 may be displayed in response to the driver or other physical occupant of the vehicle conforming that he or she wants to "ride" with the virtual occupant.

A first background area indicated by numeral 502 may be rendered based on the emotional state of a physical occupant. A second background area indicated by numeral 504 may be rendered for a virtual occupant. The background area for the virtual occupant may be determined based on external data, such as the user's profile picture and determining a color that corresponds to the profile picture. For example, if the virtual occupant is wearing a yellow hat in his or her profile picture, the background aura may be yellow. In various embodiments, the vehicle may connect to other devices to determine the virtual occupant's emotional state. For example, if the virtual occupant wears a fitness tracker, biometric data from the fitness tracker may be used to determine the virtual occupant's heart rate or other biometric data in real-time.

Graphical element 506 may represent a playlist or other content list that is generated based on profile information of multiple users. Graphical element 506 may depict a playlist that is determined based on the profile information of two or more users, at least one of which is a virtual occupant. For example, if Ella likes jazz, pop, and rock music but dislikes classical music, whereas Dillian enjoys rap music, pop music, and dislikes rock music, a playlist of songs may be created based on those preferences. In this hypothetical example, songs from pop music genre may be played more frequently because both users enjoy the genre, whereas songs from rock and/or classical music may be played less frequently or not at all due to being disliked. Songs may be selected from existing playlists that were generated by a user or as recommendations specific to a user.

Graphical element 508 may refer to a map that depicts avatars or profile pictures for the multiple occupants. For example, the controller may request and receive avatar or profile information for each occupant and display them concurrently in graphical element 508. In various embodiments, the map may include interactable elements that are detected based on the combined interactions of the multiple occupants. For example, if Dillian and Ella have previously visited "Finsbury" together, when that point of interest is present on the map, it may be highlighted in a different color, glowing, or otherwise indicated as being interactable. When a user interacts with this element—such as by clicking on it—additional information may be surfaced based on those interactions, such as information regarding when they visited the zoo together, photos taken at the location during that trip, photos taken at the location during that trip that include both occupants, and so on and so forth. In various embodiments, photos that are marked as being private will not be selected by the emotional HMI system for automatic presentation. It is noted that in some embodiments, graphical element 508 distinguishes between virtual occupants and physical occupants by showing avatars for physical occupants in the map but not showing avatars for virtual occupants on the map. However, this need not be the case and in other embodiments (not shown in FIG. 5) the virtual occupant's avatar may be presented on the map as being alongside the physical occupants' avatars.

Graphical element 510 illustrates aggregate statistic collected for historical trips. For example, the vehicle may track a running tally of the number of times users have taking a journey or ride together, the number of times they have chucked together, how many songs they have listened together, and so on and so forth. Various data can be collected for this purpose, such as keeping a database of the number of times a user has taken a trip, the identified occupants on each trip, etc.

Graphical element 512 illustrates a graphical interface that shows content that is shown based on combined interactions of two or more users. Specifically, FIG. 5 shows a non-limiting example of audio content (e.g., podcasts) that Ella and Dillian have listened to together. In some embodiments, a recommendation is presented for content that is shared in common between two or more uses. For example, if two occupants in a vehicle are both listening to the same podcast, a recommendation may be presented to allow for both users to listen to the next episode of the podcast together.

Figure 6:
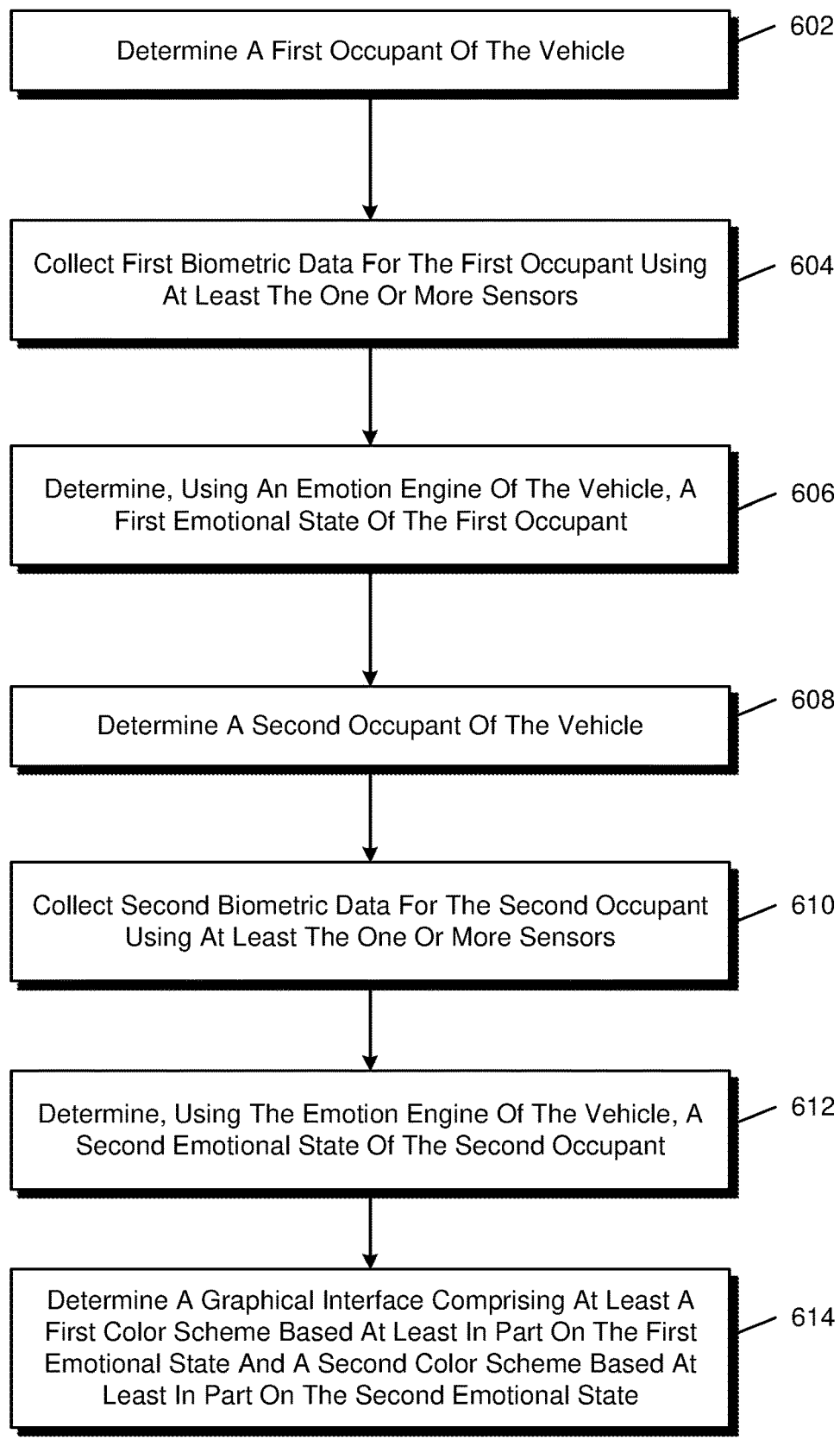
FIG. 6 shows an illustrative example of a process for generating emotional human-machine interfaces, in accordance with one or more example embodiments of the present disclosure.

FIG. 6 shows an illustrative example of a process 600 for generating emotional human-machine interfaces, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. In various embodiments, the computer-executable instructions are loaded on an electronic system of a vehicle that locally performs various methods, routines, and processes described in connection with process 600. In some embodiments, the computer-executable instructions are executed on a remote system (e.g., remote server) that the vehicle communications with over a network connection. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5. Process 600 may be performed by an infotainment system of an electric vehicle implemented in the context of FIG. 1, for example.

In at least one embodiment, process 600 comprises a step to determine a first occupant of the vehicle 602. The occupant may refer to a physical occupant of the vehicle. The first occupant may be detected or otherwise determined using sensors within a vehicle, such as motion sensors, force and seating sensors used to determine when an occupant is seated in the vehicle, cameras, and so on and so forth.

In at least one embodiment, process 600 comprises a step to collect first biometric data for the first occupant using at least the one or more sensors 604. The biometric data may include such as the occupant's speech patterns, speech volume, heart rate, temperature, eye movement, blink rate, and more may be used to classify the user's present emotional state according to a set of predefined emotional states such as being shocked, bored, happy, sad, angry, and more. In some embodiments, the vehicle's sensors are used to directly collect and process such data. In some embodiments, the vehicle communicates with an external device, such as a fitness tracker to receive and then process the biometric data.

In at least one embodiment, process 600 comprises a step to determine, using an emotion engine of the vehicle, a first emotional state of the first occupant 606. A user's emotional state may be determined using a machine-learning model trained to utilize biometric data to classify a user's mood. Information such as the user's speech patterns, speech volume, heart rate, temperature, eye movement, blink rate, and more may be used to classify the user's present emotional state according to a set of predefined emotional states such as being shocked, bored, happy, sad, angry, and more. In various embodiments, user generated data such as social media posts, text messages, phone calls (or transcriptions thereof) may be used to determine the user's emotional state, either in place of or in addition to biometric data.

In various embodiments, a collection of data that includes biometric data and/or user generated data may be used to determine the user's current emotional state and a background "aura" may be displayed on an emotional HMI that reflects the user's current state. In various embodiments, a predefined mapping of emotional states to colors is used to select an appropriate color scheme for the aura. In various embodiments, the aura is not a static image but rather, is a visual element that is constantly changing or moving. For example, a gradient of colors according to the selected color scheme may be shown that changes at various rates. When the user has a higher heart rate, the gradient may change faster. A first graphical interface for a first emotional HMI may be generated for a first occupant, and the emotional HMI may be updated when a second occupant enters the vehicle.

In at least one embodiment, process 600 comprises a step to determine a second occupant of the vehicle 608. For example, the second occupant may enter the vehicle and sit in a passenger-side seat of the vehicle. The location and identity of the occupant may be determined using on-board sensors, connections to devices known to be associated with a particular identity being established, and so on and so forth.

In at least one embodiment, process 600 comprises a step to collect second biometric data for the second occupant using at least the one or more sensors 610. The biometric data may be collected similarly to the techniques described in connection with the first occupant. In various embodiments, different modes of collection may be used between the first, second, third, etc., occupant. For example, a first occupant may provide biometric data via on-board sensors such as a heart rate monitor integrated into the steering wheel, whereas a second occupant's heart rate may be determined via a wearable device such as a fitness tracker attached to the second occupant.

In at least one embodiment, process 600 comprises a step to determine, using an emotion engine of the vehicle, a second emotional state of the second occupant 612. A user's emotional state may be determined using a machine-learning model trained to utilize biometric data to classify a user's mood. Information such as the user's speech patterns, speech volume, heart rate, temperature, eye movement, blink rate, and more may be used to classify the user's present emotional state according to a set of predefined emotional states such as being shocked, bored, happy, sad, angry, and more. In various embodiments, user generated data such as social media posts, text messages, phone calls (or transcriptions thereof) may be used to determine the user's emotional state, either in place of or in addition to biometric data.

An emotion engine may be used to determine one or more graphical elements of the interface. For example, the background area indicated by numeral 202 may represent a gradient or other pattern of color that is determined based on the current emotional state of the user. A user's emotional state may be determined using a machine-learning model trained to utilize biometric data to classify a user's mood. Information such as the user's speech patterns, speech volume, heart rate, temperature, eye movement, blink rate, and more may be used to classify the user's present emotional state according to a set of predefined emotional states such as being shocked, bored, happy, sad, angry, and more. In various embodiments, user generated data such as social media posts, text messages, phone calls (or transcriptions thereof) may be used to determine the user's emotional state, either in place of or in addition to biometric data. In all, a collection of data that includes biometric data and/or user generated data may be used to determine the user's current emotional state and a background "aura" may be displayed on an emotional HMI that reflects the user's current state. In various embodiments, a predefined mapping of emotional states to colors is used to select an appropriate color scheme for the aura. In various embodiments, the aura is not a static image but rather, is a visual element that is constantly changing or moving. For example, a gradient of colors according to the selected color scheme may be shown that changes at various rates. When the user has a higher heart rate, the gradient may change faster.

In at least one embodiment, process 600 comprises a step to generate a music playlist based on both the first music preference information and the second music preference information and to present the music playlist in the graphical interface.

In various embodiments, process 600 may be implemented wherein placement of the first color scheme and the second color scheme are determined based at least in part on physical location of the first occupant and second occupant, respectively.

In various embodiments, process 600 may be implemented the vehicle may further identify a plurality of photos that includes at least the first occupant and the second occupant and present at least a portion of the plurality of photos in the graphical interface. In various embodiments, the vehicle may further filter the photos so that the plurality of photos does not include photos that are marked as private.

In various embodiments, process 600 may be implemented to change color of one or more interior lighting elements of the vehicle in a first region of the vehicle associated with the first occupant to match the first color scheme.

In various embodiments, process 600 may be implemented determine one or more points of interest near a current location of the vehicle, identify, based on historical trip data collected by the vehicle, that the first occupant and the second occupant visited a point of interest together, and highlight the identified point of interest in a map of the graphical interface.

In various embodiments, process 600 may be implemented to further collect interaction data between the first occupant and the second occupant and present a summary of the interaction data between the first occupant and the second occupant.

In various embodiments, process 600 may be implemented wherein the interaction data comprises speech that is analyzed to determine counts for one or more types of interactions between the first occupant and the second occupant.

Figure 7:
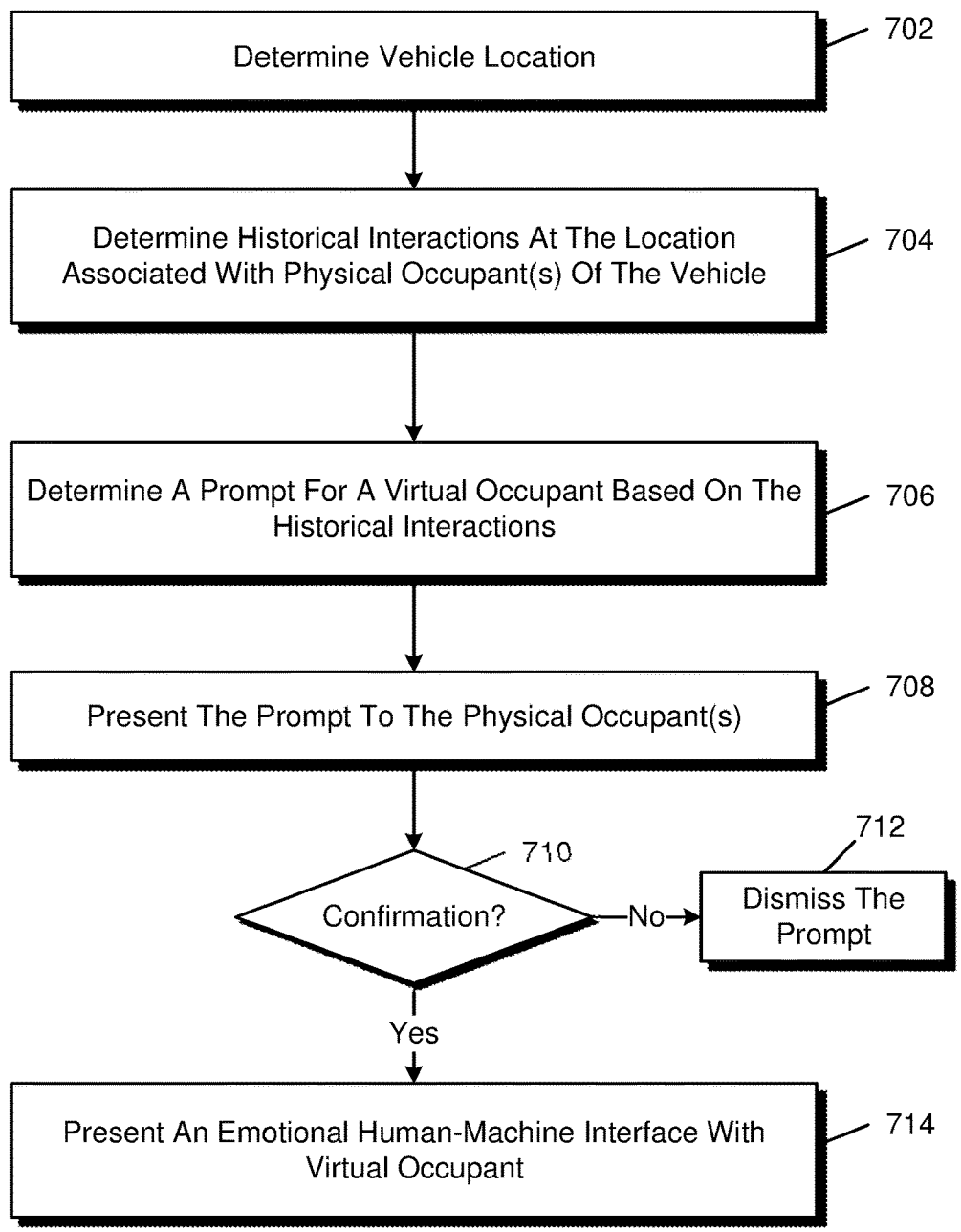
FIG. 7 shows an illustrative example of a process for generating emotional human-machine interfaces, in accordance with one or more example embodiments of the present disclosure.

FIG. 7 shows an illustrative example of a process 700 for generating emotional human-machine interfaces, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. In various embodiments, the computer-executable instructions are loaded on an electronic system of a vehicle that locally performs various methods, routines, and processes described in connection with process 700. In some embodiments, the computer-executable instructions are executed on a remote system (e.g., remote server) that the vehicle communications with over a network connection. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-5. Process 700 may be performed by an infotainment system of an electric vehicle implemented in the context of FIG. 1, for example.

In at least one embodiment, process 700 comprises a step to determine vehicle location 702. The vehicle's location may be determined as GPS coordinates. Geolocation data may be used to determine the relative location of the vehicle to points of interest or other types of locations. An on-board GPS sensor integrated to the vehicle may be used to determine the vehicle location, or the location may be provided by an external device, such as a smartphone inside the phone that is communicatively coupled to the vehicle (e.g., Bluetooth connection).

In various embodiments, process 700 comprises a step to determine historical interactions at the location associated with physical occupant(s) of the vehicle 704. Physical occupants may refer to users that are physically present inside the vehicle. Historical interactions may refer to recorded interactions between the physical occupant and other individuals that have been recorded and are accessible to the vehicle. These may include trips that users have previously taken. A historical interaction may be recorded when the vehicle is used for a journey or trip. Users may be associated with a journey or trip in any suitable manner. For example, when a device such as a smartphone is paired with the vehicle, a user identity may be provided to the vehicle from the device. This user identity information may be used to infer that user is participating in the journey. Sensors within the vehicle may be used to determine the identity of individuals. For example, biometric data such as fingerprint data or facial recognition technology may be used to identify the individuals within the vehicle. Historical interactions may be stored locally on the device or may be stored remotely in a server accessible to the vehicle.

In various embodiments, process 700 comprises a step to determine a prompt for a virtual occupant based on the historical interactions 706. This step may comprise analyzing one or more historical interactions to identify a set of contextually relevant historical interactions. In some embodiments, contextual relevance is determined based on location. For example, when a user drivers past a location where she previously attended a concert with a friend, a prompt may be generated for that friend along with an image, social media post, or other interactions between the two that may remind the user of the historical interaction.

While FIG. 7 depicts a process where contextual relevance is determined based on location, other forms of contextual relevance may be used. For example, a first individual driving the vehicle may receive a phone call from a second individual. The identity of the second individual may be ascertained using various techniques, such as caller identification, the user's address book, speech recognition, and so on and so forth. Upon completion of the call, a prompt may be generated based at least in part on temporal relevance. Other forms of contextual relevance are described throughout this disclosure and may be used to determine a suitable virtual occupant for the prompt.

In various embodiments, process 700 comprises a step to present the prompt to the physical occupant(s) 708. The prompt may be presented on an infotainment system, for example, as depicted in FIG. 1. In some embodiments, the prompt is presented by a virtual assistant, which may use graphical and/or audio prompts to the user. For example, the virtual assistant may synthesize the following audio prompt when the user drives past a location with a historical interaction "You visited Kensington with Dillian two years ago. Do you want to have Dillian's virtual aura ride along with you?"

In various embodiments, process 700 comprises a step to determine whether 710 710 a confirmation was detected. The prompt may include an indication that allows the user to confirm or dismiss the prompt. A user may interact with a prompt by touching the prompt on a touchscreen, by performing a voice command (e.g., a "yes" or "no" utterance) or by a gesture that is detected by interior cameras of the vehicle (e.g., a head nod or headshake). If no affirmative confirmation is detected, the process 700 includes a step to dismiss the prompt 712. In some cases, this involves removing a graphical element from the HMI. However, if the user affirmatively responds to the prompt, then the process 700 may include a step to present an emotional HMI that includes the virtual occupant 714. This virtual occupant may be presented in accordance with techniques described in connection with FIG. 4 and/or FIG. 5. In various embodiments, the virtual occupant rides in the vehicle for the remainder of the present trip or journey. In some embodiments, the virtual occupant will be removed based on time and/or distance considerations (e.g., when it is determined that the virtual occupant is no longer contextually relevant). In some embodiments, physical occupants may issue a command to dismiss or remove a virtual occupant from the emotional HMI.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
   one or more sensors;
   one or more processors; and
   memory storing executable instructions that, as a result of execution by the one or more processors, cause the one or more processors to:
   determine a first occupant of the vehicle;
   collect first biometric data for the first occupant using at least the one or more sensors;
   determine user-generated data associated with the first occupant, the user-generated data comprising at least one of a social media post, a text message, or a phone call;
   determine, using an emotion engine of the vehicle and based at least in part on the first biometric data and the user-generated data, a first emotional state of the first occupant;
   determine a second occupant of the vehicle;
   collect second biometric data for the second occupant using at least the one or more sensors;
   determine, using the emotion engine of the vehicle and based at least in part on the second biometric data, a second emotional state of the second occupant; and
   present, via a display of a human machine interface (HMI) of the vehicle, a graphical interface comprising at least a first background color scheme on a first portion of the display based at least in part on the first emotional state and a second background color scheme on a second portion of the display based at least in part on the second emotional state, wherein the first portion of the display is closer in proximity to a physical location of the first occupant and the second portion of the display is closer in proximity to a physical location of the second occupant.

2. The vehicle of claim 1, wherein the one or more processors further:
determine first music preference information associated with the first occupant;
determine second music preference information associated with the second occupant;
generate a music playlist based on both the first music preference information and the second music preference information; and
present the music playlist in the graphical interface.

3. The vehicle of claim 1, wherein the one or more processors further:
identify a plurality of photos that includes at least the first occupant and the second occupant; and
present at least a portion of the plurality of photos in the graphical interface.

4. The vehicle of claim 3, wherein the plurality of photos does not include photos that are marked as private.

5. The vehicle of claim 1, wherein the one or more processors further:
change color of one or more interior lighting elements of the vehicle in a first region of the vehicle associated with the first occupant to match the first background color scheme.

6. The vehicle of claim 1, wherein the one or more processors further:
determine one or more points of interest near a current location of the vehicle;
identify, based on historical trip data collected by the vehicle, that the first occupant and the second occupant visited a point of interest together; and
highlight the point of interest in a map of the graphical interface.

7. The vehicle of claim 1, wherein the vehicle is further configured to:
collect interaction data between the first occupant and the second occupant; and
present a summary of the interaction data between the first occupant and the second occupant.

8. The vehicle of claim 7, wherein the interaction data comprises speech that is analyzed to determine counts for one or more types of interactions between the first occupant and the second occupant.

9. A method, comprising:
determining a first occupant of a vehicle;
collecting first biometric data for the first occupant using at least one or more sensors of the vehicle;
determining user-generated data associated with the first occupant, the user-generated data comprising at least one of a social media post, a text message, or a phone call;
determining, using an emotion engine of the vehicle and based at least in part on the first biometric data and the user-generated data, a first emotional state of the first occupant;
determining a second occupant of the vehicle;
collecting second biometric data for the second occupant using at least the one or more sensors;
determining, using the emotion engine of the vehicle and based at least in part on the second biometric data, a second emotional state of the second occupant; and
presenting, via a display of a human machine interface (HMI) of the vehicle, a graphical interface comprising at least a first background color scheme on a first portion of the display based at least in part on the first emotional state and a second background color scheme on a second portion of the display based at least in part on the second emotional state, wherein the first portion of the display is closer in proximity to a physical location of the first occupant and the second portion of the display is closer in proximity to a physical location of the second occupant.

10. The method of claim 9, further comprising:
determining first music preference information associated with the first occupant;
determining second music preference information associated with the second occupant;
generating a music playlist based on both the first music preference information and the second music preference information; and
presenting the music playlist in the graphical interface.

11. The method of claim 9, further comprising changing color of one or more interior lighting elements of the vehicle in a first region of the vehicle associated with the first occupant to match the first background color scheme.

12. The method of claim 9, further comprising:
determining one or more points of interest near a current location of the vehicle;
identifying, based on historical trip data collected by the vehicle, that the first occupant and the second occupant visited a point of interest together; and
highlighting the point of interest in a map of the graphical interface.

13. The method of claim 9, further comprising:
collecting interaction data between the first occupant and the second occupant; and
presenting a summary of the interaction data between the first occupant and the second occupant.

14. The method of claim 13, wherein the interaction data comprises speech that is analyzed to determine counts for one or more types of interactions between the first occupant and the second occupant.

15. A method, comprising:
determining a physical occupant of a vehicle;
collecting first biometric data for the physical occupant using at least one or more sensors of the vehicle;
determining, using an emotion engine of the vehicle, a first emotional state of the physical occupant;
determining a virtual occupant associated with the physical occupant of the vehicle, the virtual occupant being a person who is not physically present in the vehicle;
determining a first background color scheme for the physical occupant based at least in part on the first biometric data;
determining a second background color scheme based on information associated with the virtual occupant; and
presenting, via a display of a human machine interface (HMI) of the vehicle, a graphical interface comprising at least the first background color scheme on a first portion of the display and the second background color scheme on a second portion of the display, wherein the first portion of the display is closer in proximity to a physical location of the physical occupant.

16. The method of claim 15, wherein determining the second background color scheme comprises analyzing one or more user profile photos associated with the virtual occupant.

17. The method of claim 15, wherein determining the second background color scheme comprises:
obtaining second biometric data from a wearable device of the virtual occupant; and determining, using the emotion engine of the vehicle and based at least in part on the second biometric data, the second background color scheme.

18. The method of claim 15, further comprising determining that the vehicle is at or near a location associated with a historical interaction between the physical occupant and the virtual occupant, wherein presenting the second background color scheme on the second portion of the display is based on the vehicle being at or near the location.

* * * * *